Oct. 31, 1961  G. E. BRACKETT  3,006,196
CONTROLLER FOR MACHINES
Filed Jan. 18, 1960  2 Sheets-Sheet 1

INVENTOR
GEORGE E. BRACKETT

BY *Roberts, Cushman & Grover*
ATTORNEYS

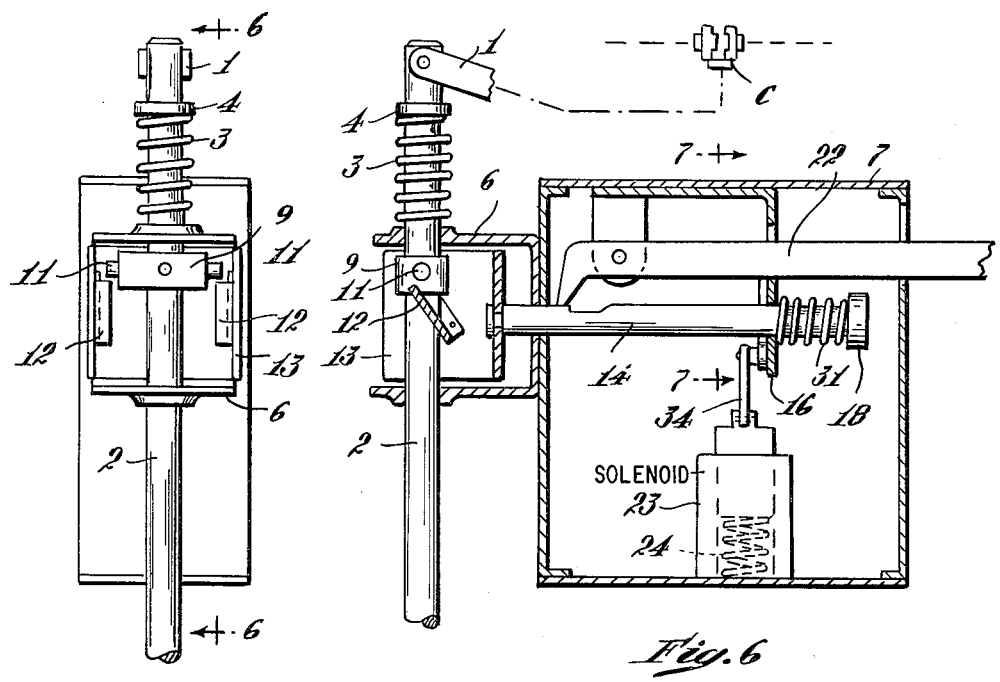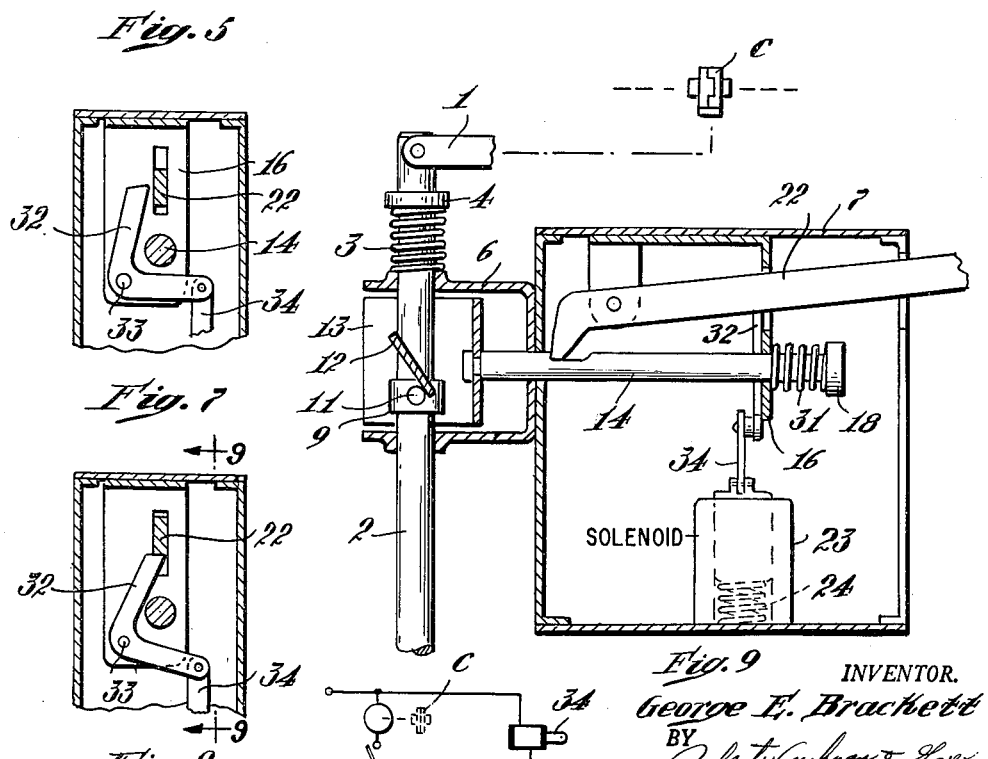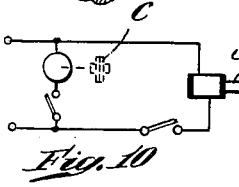

United States Patent Office 3,006,196
Patented Oct. 31, 1961

3,006,196
CONTROLLER FOR MACHINES
George E. Brackett, Candia, N.H., assignor to Basic Products Corporation, West Milwaukee, Wis., a corporation of Wisconsin
Filed Jan. 18, 1960, Ser. No. 2,875
9 Claims. (Cl. 74—2)

This invention is particularly applicable to punch presses and the like but it may be used to control any kind of apparatus, especially clutches which transmit considerable power and which therefore require substantial forces for operation, this application being a continuation-in-part of Ser. No. 827,549, filed July 16, 1959.

Objects of the invention are to provide a controller which, while involving substantial forces in operation, can be tripped easily, which can therefore be operated easily, which automatically moves to inoperative position when current fails, which is simple and economical to produce and which is reliable and durable in use.

According to the present invention the controller comprises an actuator movable back and forth along a predetermined path between operative and inoperative positions, a main spring yieldingly urging the actuator toward inoperative position, a holder for holding the actuator in operative position, the holder being movable back and forth transversely of said path between retracted and holding positions, a double-faced cam on the holder and a cam follower on the actuator, the cam being inclined to said path so that when the actuator is in inoperative position the follower is opposite one face of the cam at one end of the cam and when the actuator is in operative position the follower is opposite the other face of the cam at the other end of the cam, the follower traveling along said one face of the cam from said first end to and beyond said second end when the actuator is moved to operative position, thereby to move the holder to holding position, the follower traveling along said other face to and beyond said first end when the actuator returns to inoperataive position, a latch to retain the holder in holding position, and spring means for moving the holder, the spring means being in equilibrium when the holder is in idle position and biased in one direction when the follower reaches said one end of the cam to bring said one face opposite the follower and biased in the other direction when it reaches said other end of the cam to bring said other face opposite the follower. While the latch may be moved out of latching position by a tripper such as an electromagnet, preferebly it is moved out of latching position by a spring or gravity and is held in latching position by an electromagnet supplied with current from the same source which drives the apparatus so that the clutch is thrown out automatically when the current fails. The spring means may comprise two springs which oppose each other or a single spring which is compressed when actuated in one direction and stretched when actuated in the other direction.

For the purpose of illustration typical embodiments of the invention are shown in the accompanying drawings in which:

FIG. 5 is a side view of another embodiment with the parts in inoperative position;

FIG. 6 is a section on line 6—6 of FIG. 5;

FIG. 7 is a section on line 7—7 of FIG. 6;

FIG. 8 is a view like FIG. 7 showing the parts in operative position;

FIG. 9 is a section on line 9—9 of FIG. 8; and

FIG. 10 is a circuit diagram.

Figure 1:
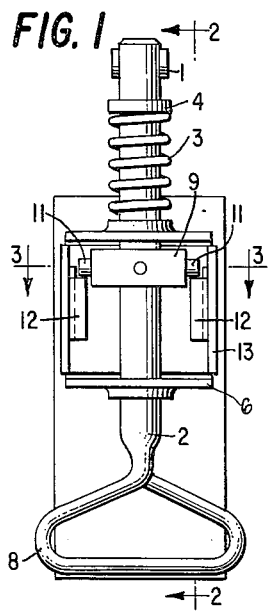
FIG. 1 is an end view of one embodiment showing the parts in inoperative position.
Figure 2:
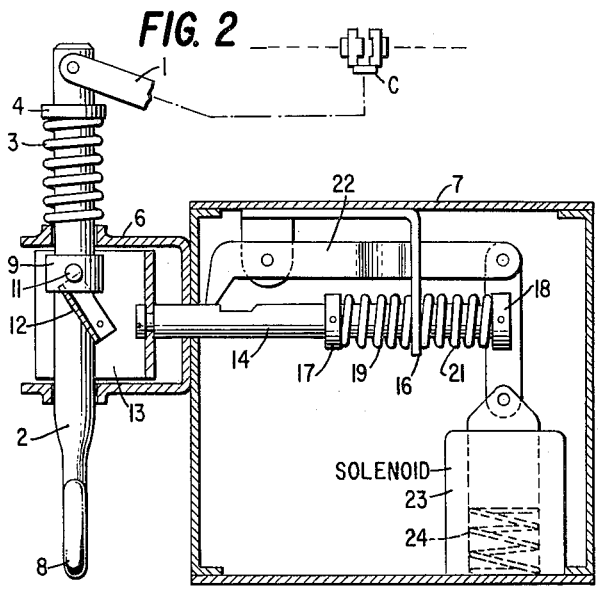
FIG. 2 is a section on line 2—2 of FIG. 1.
Figure 3:
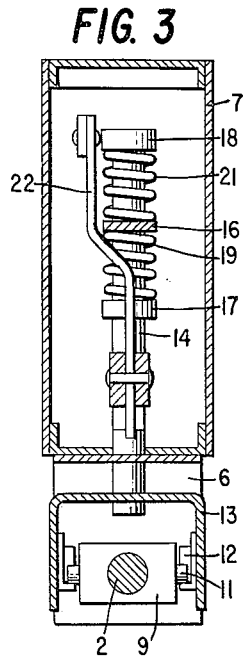
FIG. 3 is a section on line 3—3 of FIG. 1.
Figure 4:
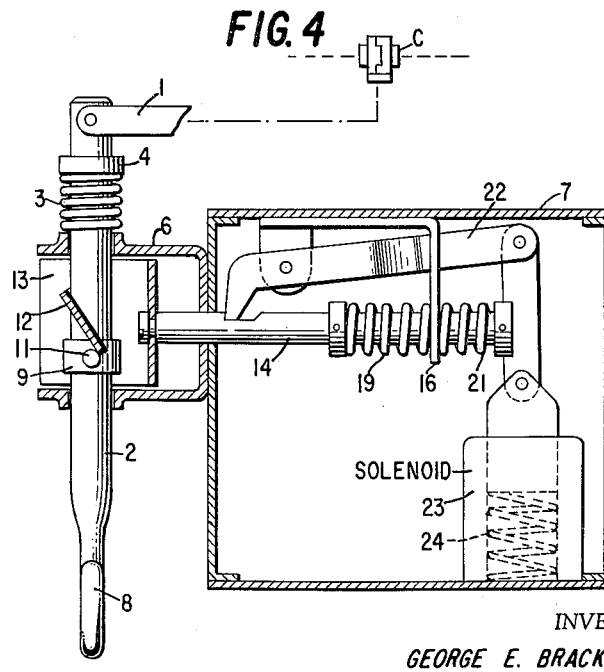
FIG. 4 is a section like FIG. 2 showing the parts in operative position.

In the first embodiment the controller is connected to a clutch C through an arm 1 connected to an actuator 2 which is movable back and forth from the inoperative position shown in FIGS. 1 to 3 where the clutch is out to the operative position shown in FIG. 4 where the clutch is engaged. The actuator is yieldingly urged toward inoperative position by means of a main spring 3 interposed between a collar 4 fast to the actuator and a housing 6 fast to the side of the larger housing 7. The actuator has a handle 8 by which it may be pulled to operative position. Fast to the actuator inside the housing 6 is a collar 9 carrying cam followers 11 which cooperate with cams 12 fast to the inner faces of a U-shaped part 13 mounted on the end of a plunger 14 sliding in a bearing 16 and in openings in the housings 6 and 7. Fast to the plunger 14 are two collars 17 and 18 and interposed between the bearing 16 and the two collars are springs 19 and 21. The holder, comprising parts 12, 13, 14, 17 and 18, is held in holding position by means of a latch 22 controlled by a solenoid 23. When the holder is in the idle position shown in FIGS. 1 to 3 springs 19 and 21 are balanced but when the holder is moved to the holding position shown in FIG. 4 spring 21 is tensioned more than 19 so as to bring the holder back to idle position when the latch is disengaged.

As shown in FIGS. 2 and 4 the cams 12 are inclined to the paths of the followers so that as the actuator is moved from the inoperative position shown in FIG. 2 to the operative position shown in FIG. 4 the followers move along the right faces of the cams from the upper ends to the lower ends and thence over the lower ends of the cams to the position shown in FIG. 4. As the followers pass over the lower ends of the cams the latch 22 is snapped into the recess in the plunger 14 by means of the spring 24 in the solenoid. Thus when the followers abut the left faces of the cams the actuator 2 is held in operative position by the latch. When the latch is tripped by energizing the solenoid 23 the spring 3 returns the actuator to the idle position shown in FIG. 2, the followers traveling along the left faces of the cams. In passing along the left faces of the cams the followers move the holder to the right beyond the idle position shown in FIG. 2 to a retracted position but when they reach the upper ends of the cams the spring 21 returns the holder to the idle position.

The second embodiment is similar to the first embodiment and corresponding parts are correspondingly numbered. However instead of having two springs 19 and 21 a single spring 31 is caused to serve the same purposes by connecting it to the head 18 of the plunger and to the bracket 16 by brazing or otherwise, the spring being in equilibrium when the plunger 14 is in the idle position shown in FIG. 6 and compressed when the followers 11 reach the lower ends of the cams 12 to bring the left-hand faces of the cams opposite the followers and stretched when the followers reach the upper ends of the cams to bring the right-hand faces of the cams opposite the followers in the position shown in FIG. 2.

In the second embodiment the latch 22 is moved into latched position by hand and held there by means of an L-shaped catch 32 pivoted on the brackets 16 at 33 and actuated by a solenoid 23 and spring 24 through the medium of a link 34. When the solenoid is energized the catch 32 is moved into the position shown in FIGS. 8 and 9 to hold the catch in latching position, and when the solenoid is deenergized the spring 24 moves the catch to the unlatched position shown in FIG. 7 permitting the plunger 14 to be returned by spring 31 to its idle position shown in FIG. 6. By connecting the solenoid 23 to the same source as drives the machine through clutch C (FIG. 10) the clutch is automatically thrown out when current fails so that after current is restored the machine does not start up until the clutch is thrown in again.

It should be understood that the present disclosure is for the purpose of illustration only and that this invention includes all modifications and equivalents which fall within the scope of the appended claims.

I claim:

1. A controller comprising an actuator movable back and forth along a predetermined path between operative and inoperative positions, a main spring yieldingly urging the actuator toward inoperative position, a holder for holding the actuator in operative position, the holder being movable back and forth transversely of said path between retracted and holding positions past an idle position, a double-faced cam on the holder and a cam follower on the actuator, the cam being inclined to said path so that when the actuator is in operative position the follower is opposite one face of the cam at one end of the cam and when the actuator is in operative position the follower is opposite the other face of the cam at the other end of the cam, the follower traveling along said one face of the cam from said first end to and beyond said second end when the actuator is moved to operative position, thereby to move the holder to holding position, the follower traveling along said other face to and beyond said first end when the actuator returns to inoperative position, a latch to retain the holder in holding position, and spring means for moving the holder, the spring means being in equilibrium when the holder is in idle position and biased in one direction when the follower reaches said one end of the cam to bring said one face opposite the follower and biased in the other direction when it reaches said other end of the cam to bring said other face opposite the follower.

2. A controller according to claim 1 further characterized by electromagnetic means for controlling said latch.

3. A controller according to claim 2 further characterized by means for moving the latch out of latching position when the electromagnet is energized.

4. A controller comprising an actuator movable back and forth along a predetermined path between operative and inoperative positions, a main spring yieldingly urging the actuator toward inoperative position, a holder for holding the actuator in operative position, the holder being movable back and forth transversely of said path between retracted and holding positions past an idle position, a double-faced cam on the holder and a cam follower on the actuator, the cam being inclined to said path so that when the actuator is moved to operative position the follower travels along one face of the cam to move the holder beyond holding position and thence passes beyond one end of the cam, a second spring to return the holder to holding position and return the cam to a position at which its other face is in the path of the follower, thereby to hold the actuator in operative position, a latch to retain the holder in holding position, a tripper to move the latch out of latching position and permit said main spring to produce a return movement of the actuator to inoperative position, during which return movement the follower travels along said other face to and beyond the other end of the cam and the holder moves from holding position past idle position to a retracted position, and a third spring for returning the holder to idle position in which said first face of the cam is in the path of the follower.

5. A controller according to claim 4 wherein said second and third springs oppose each other and are in equilibrium when the holder is in idle position.

6. A controller according to claim 4 wherein said cam and follower are disposed on one side of the actuator and a duplicate cam and follower are disposed on the opposite side of the actuator.

7. A controller comprising an actuator movable back and forth along a predetermined path between operative and inoperative positions, a main spring connected to the actuator yieldingly to urge the actuator toward inoperative position, a holder bearing on the actuator for holding the actuator in operative position against the action of said spring, the holder being movable back and forth between idle and holding positions, a latch engaging the holder to retain the holder in holding position, means acting on the holder to return the holder to idle position when released from the latch, a catch engaging the latch for holding the latch in latching position, means associated with the catch for maintaining the catch in holding position, said last means including an electromagnet, and means acting on the catch to return the catch to inoperative position when the electromagnet is deenergized, thereby to permit said main spring to return the actuator to inoperative position.

8. A controller comprising an actuator movable back and forth along a predetermined path between operative and inoperative positions, a main spring yieldingly urging the actuator toward inoperative position, a holder for holding the actuator in operative position, the holder being movable back and forth transversely of said path between retracted and holding positions, a double-faced cam on the holder and a cam follower on the actuator, the cam being inclined to said path so that when the actuator is in inoperative position the follower is opposite one face of the cam at one end of the cam and when the actuator is in operative position the follower is opposite the other face of the cam at the other end of the cam, the follower traveling along said one face of the cam from said first end to and beyond said second end when the actuator is moved to operative position, thereby to move the holder to holding position, the follower traveling along said other face to and beyond said first end when the actuator returns to inoperative position, a latch to retain the holder in holding position, an electromagnet for controlling the latch, and means to move the latch out of latching position when the magnet is deenergized, thereby to permit said main spring to produce a return movement of the actuator to inoperative position.

9. A controller according to claim 8 further characterized by a catch for holding the latch in latching position and means for moving the catch out of holding position when said electromagnet is deenergized.

References Cited in the file of this patent

UNITED STATES PATENTS

| 1,208,863 | Waldow | Dec. 19, 1916 |
| 1,404,635 | Muehlhauser | Jan. 24, 1922 |
| 1,461,010 | Amdursky | July 3, 1923 |
| 2,299,249 | Obergfell | Oct. 20, 1942 |
| 2,333,370 | Graham | Nov. 2, 1943 |
| 2,802,553 | Roggenstein et al. | Aug. 13, 1957 |
| 2,875,617 | Murphy | Mar. 3, 1959 |
| 2,869,696 | Hill | Jan. 20, 1959 |

FOREIGN PATENTS

| 475,870 | Germany | Apr. 15, 1927 |